United States Patent [19]

Goel et al.

[11] Patent Number: 4,596,853

[45] Date of Patent: Jun. 24, 1986

[54] REACTIVE POLYMER SOLUTIONS AND POLYMERIZATES THEREOF

[75] Inventors: Anil B. Goel, Worthington; Peggy A. Blackburn, Plain City, both of Ohio

[73] Assignee: Ashland Oil, Inc., Ashland, Ky.

[21] Appl. No.: 702,705

[22] Filed: Feb. 19, 1985

[51] Int. Cl.[4] .................... C08F 8/30; C08L 77/00
[52] U.S. Cl. .................... 525/123; 525/131; 525/395; 525/398; 525/415; 525/420; 525/435; 525/440; 525/441; 525/453; 525/461; 525/467; 525/535; 525/536; 525/540
[58] Field of Search ............. 525/123, 131, 395, 398, 525/415, 420, 435, 440, 441, 453, 461, 467, 535, 536, 540

[56] References Cited

U.S. PATENT DOCUMENTS 4,501,679  2/1985  Reierson et al. .................... 252/77
4,539,376  9/1985  Goel et al. .......................... 525/375

FOREIGN PATENT DOCUMENTS 3235933  3/1984  Fed. Rep. of Germany .

*Primary Examiner*—Herbert J. Lilling
*Attorney, Agent, or Firm*—John F. Jones

[57] ABSTRACT

Polymerizable solutions of mixtures containing a bicyclic amide acetal, a polymer which does not react with the bicyclic amide acetal and a monomer or polymer capable of undergoing condensation polymerization with the bicyclic amide acetal, a process for polymerization of such solutions and the novel polymers resulting from the polymerization are described.

9 Claims, No Drawings

REACTIVE POLYMER SOLUTIONS AND POLYMERIZATES THEREOF

This invention relates to solutions of polymers in bicyclic amide acetal solvents and to polymerizates produced therefrom by condensation polymerization of the bicyclic amide acetal solvent of such solutions with a reactive monomer or polymer such as a polyisocyanate.

Bicyclic amide acetals are more fully disclosed in the copending U.S. patent applications of Anil B. Goel and Anil B. Goel and Harvey J. Richards, respectively, filed as Ser. Nos. 641,238 and 641,242 on Aug. 16, 1984. Bicyclic amide acetals have been shown to react with polyisocyanates to produce brittle polymers in West German patent publication No. 3,235,933. Bicyclic amide acetals have also been shown to react with monocarboxylic acids to form esters in Angew. Chem. 79, 189(1967). No prior disclosure has been made for use of bicyclic amide acetals as solvents for any polymers including polymers such as polyesters, polysulfones, styrene/acrylonitrile copolymers, polyphenylene oxides, polycarbonates, polyethyl oxazoline, polyamides, and polyurethanes.

We have discovered that liquid bicyclic amide acetals will dissolve many polymers to form solutions having reasonably low viscosities and these solutions can contain from 1% to 50% by weight of polymer and preferably from about 10 to 30% by weight of polymer. These solutions can be used, per se, for coating, adhesives, and the like, or they can be caused to undergo further polymerization through the bicyclic amide acetal groups to give novel polymer blends which are usually solid, tough materials. Various fillers, colorants, pigments, processing aids, and the like which are well known to those skilled in the art can be included in the solutions and further polymerized solutions and products of this invention.

The liquid bicyclic amide acetals useful in this invention include those conforming to the Formula I:

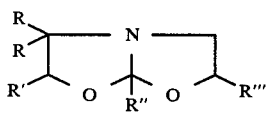

wherein R independently represents hydrogen or an alkyl group having from 1 to 18 carbon atoms, R' represents hydrogen, an alkyl group having from 1 to 18 carbon atoms, an aryl group having from 6 to 12 carbon atoms or an ether group having from 1 to 18 carbon atoms, R" represents an alkyl group having from 1 to 18 carbon atoms or an alkaryl group having from 7 to 20 carbon atoms, and R''' represents hydrogen, an alkyl group having from 1 to 18 carbon atoms, an aryl group having from 6 to 12 carbon atoms or an ether group having from 1 to 20 carbon atoms.

The polymers which are not reactive with bicyclic amide acetals which can be dissolved in the bicyclic amide acetals to form the solutions of this invention include polyesters, polyethers, polysulfones, polyamides, polycarbonates, polyphenylene oxides, styrene-acrylonitrile copolymers, polyoxazolines, polyacrylates, polyurethanes, and the like.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate., dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,-3-diisocyanate, 1,4-diisocyanato cyclohexane, cyclopentene-1,3-diisocyanate, p-phenylene diisocyanate, 1-methyl phenylene-2,4-diisocyanate, naphthalene-1-4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The reactive monomer or polymer, in addition to the polyisocyanates, which will undergo condensation polymerization can be those containing functional groups reactive with bicyclic amide acetals such as carboxyl, phenolic, carboxylic anhydride, thiol, etc.

The bicyclic amide acetal-polymer solutions embodied in this invention can be further polymerized with other reactive monomers and polymers containing reactive groups and such reactive monomers and polymers which are more preferred include the afore-mentioned polyisocyanates, bis and poly carboxylic acid containing monomers and polymers, carboxylic acid anhydrides, bis and polyphenolics, thiols, acrylic acids and the like. The ratio of bicyclic amide acetal to unreactive polymer can be in the range of from 99:1 to 50:50 by weight and the equivalent weight ratio of bicyclic amide acetal to reactive monomer or polymer in the solution can be from 1:0.8 to 1:3.

The polymerization of the solutions of this invention are carried out at temperatures in the range of from about room temperature or slightly below to 200° C. Bicyclic amide acetals are bifunctional in relation to anhydrides and isocyanates and they are monofunctional in relation to phenolics, carboxylic acids and thiols.

The invention is further illustrated in the following representative examples.

EXAMPLE 1

To 30 g of methyl substituted bicyclic amide acetal (Formula I in which R, R' and R''' are hydrogen and R" is methyl) was added 3.5 g of a styrene-acrylonitrile copolymer composed of about 72% by weight of styrene and 28% by weight of acrylonitrile and having a molecular weight greater than 100,000. The mixture was stirred at room temperature under nitrogen in a closed reactor overnight. A clear solution resulted. The solution was degassed and mixed with 75 g of degassed, liquid 4,4'-methylene bis(phenylisocyanate) and the resulting solution was poured into a mold formed by parallel glass plates coated with silicone mold release and separated by 1/8 inch spacers. The mold was then placed in an oven at 100° C. for an hour followed by 135° C. for two hours. The opaque solid polymer which was removed from the mold was found to have an ASTM-D648 heat distortion temperature of 152° C. and an ASTM-D256 notched izod impact strength of 0.7 foot pounds/inch of notch. For comparison, the styrene/acrylonitrile copolymer used in this example has a heat distortion temperature of about 100° C. and a notched izod impact strength of 0.3 foot pounds/inch of notch.

EXAMPLE 2

The procedure of this example, which is outside the scope of the present invention, was carried out exactly as in Example 1 except that no styrene/acrylonitrile copolymer was used. The product was a transparent sheet which was found to have a heat distortion temperature of 149° C. and a notched izod impact strength of 0.5 foot pounds per inch of notch.

EXAMPLE 3

To 46.8 g of the bicyclic amide acetal described in Example 1 was added 11.7 g of polycaprolactone (polyester with molecular weight of greater than 30,000), and the mixture was stirred at room temperature overnight to give a clear solution containing 20% by weight of polymer. This solution was mixed with 117 g of 4,4'-methylene bis(phenyl isocyanate) and treated in a manner similar to that described in Example 1 to give an opaque, solid polymer sheet which was found to have a heat distortion temperature (HDT) of 147° C. and a notched izod impact strength of 0.7 foot pounds/inch of notch.

EXAMPLES 4-13

A series of solutions was prepared using the bicyclic amide acetal described in Example 1, 4,4'-methylene bis(phenyl isocyanate) and a polymer such as SAN(-styrene/acrylonitrile copolymer 72:28 by weight, molecular weight greater than 100,000), PC (polycarbonate—30,000-50,000 molecular weight), PE (polyester—polycaprolactone—molecular weight greater than 50,000), PS (polysulfone—high molecular weight), PPO (poly 2,6-dimethyl-1-p-phenylene oxide—high molecular weight), PEOX (poly ethyl oxazoline homopolymer of 2-ethyl oxazoline, -L=low molecular weight, 50,000; —M=200,000 molecular weight; —H=500,000 molecular weight). The solutions of bicyclic amide acetal, polymer and diisocyanate were all treated to form solid polymer sheets as described in Example 1.

The materials used and results obtained are given in the following table.

TABLE

| Example Number | Amide Acetal (g) | Polymer (g) | % Polymer in Solution | Diisocyanate (g) | Polymer HDT | Properties NII |
| --- | --- | --- | --- | --- | --- | --- |
| 4 | 29 | 7.3 (SAN) | 20 | 75 | 155 | 0.5 |
| 5 | 34 | 3.7 (PC) | 10 | 75 | — | — |
| 6 | 33 | 3.7 (PE) | 10 | 75 | 149 | 0.7 |
| 7 | 32 | 3.6 (PS) | 10 | 75 | 153 | 0.6 |
| 8 | 28 | 3.1 (PPO) | 10 | 75 | 150 | 0.3 |
| 9 | 45 | 4.5 (PEOX-L) | 10 | 105 | 147 | 0.6 |
| 10 | 44 | 4.8 (PEOX-M) | 10 | 105 | 148 | 0.5 |
| 11 | 43 | 4.8 (PEOX-H) | 10 | 105 | 143 | 0.6 |
| 12 | 44 | 19 (PEOX-L) | 30 | 113 | 140 | 0.5 |
| 13 | 35 | 4.8 (PEOX-H) | 12 | 87 | 146 | 0.6 |

We claim:

1. A polymerizable solution comprising a mixture of a bicyclic amide acetal, a polymer which is not reactive with the bicyclic amide acetal and a reactive monomer or polymer capable of undergoing condensation polymerization with the bicyclic amide acetal wherein the weight ratio of the bicyclic amide acetal to the polymer which is unreactive to the bicyclic amide acetal is within the range of from 99:1 to 50:50 and the equivalent weight ratio of bicyclic amide acetal to reactive monomer or polymer is in the range of from 1:08 to 1:3 and wherein the bicyclic amide acetal is one having the Formula

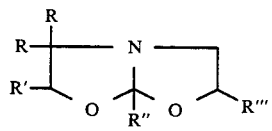

wherein R independently represents hydrogen or an alkyl group having from 1 to 18 carbon atoms, R' represents hydrogen, an alkyl group having from 1 to 18 carbon atoms or an ether group having from 1 to 18 carbon atoms, R" represents an alkyl group having from 1 to 18 carbon atoms or an alkaryl group having from 7 to 20 carbon atoms, and R''' represents hydrogen, an alkyl group having from 1 to 18 carbon atoms, an aryl group having from 6 to 12 carbon atoms or an ether group having from 1 to 20 carbon atoms and wherein the polymer which is unreactive with the bicyclic amide acetal is a member selected from the group consisting of polyesters, polysulfones, styrene/acrylonitrile copolymers, polyphenylene oxides, polycarbonates, polyethyl oxazolines, polyamides and polyurethanes and wherein the reactive monomer or polymer is one containing isocynate, carboxyl, phenolic, carboxylic anhydride or thiol groups.

2. The process comprising polymerizing the solution of Example 1 at a temperature in the range of from about room temperature up to about 200° C.

3. The polymer resulting from the polymerization of the solution of claim 1.

4. The solution of claim 1 wherein the bicyclic amide acetal is one in which R, R' and R''' are hydrogen and R'' is methyl, the polymer which is not reactive with the bicyclic amide acetal is a styrene/acrylonitrile copolymer and the reactive monomer is 4,4'-methylene bis-(phenyl isocyanate).

5. The solution of claim 1 wherein the bicyclic amide acetal is one in which R, R' and R''' are hydrogen and R'' is methyl, the polymer which is not reactive with the bicyclic amide acetal is polycaprolactone and the reactive monomer is 4,4'-methylene bis(phenyl isocyanate).

6. The solution of claim 1 wherein the bicyclic amide acetal is one in which R, R' and R''' are hydrogen and R'' is methyl, the polymer which is not reactive with the bicyclic amide acetal is a polycarbonate and the reactive monomer is 4,4'-methylene bis-phenyl isocyanate).

7. The solution of claim 1 wherein the bicyclic amide acetal is one in which R, R' and R''' are hydrogen and R'' is methyl, the polymer which is not reactive with the bicyclic amide acetal is as polysulfone and the reactive monomer is 4,4'-methylene bis(phenyl isocyanate).

8. The solution of claim 1 wherein the bicyclic amide acetal is one in which R, R' and R''' are hydrogen and R'' is methyl, the polymer which is not reactive with the bicyclic amide acetal is polyphenylene oxide and the reactive monomer is 4,4'-methylene bis(phenyl isocyanate).

9. The solution of claim 1 wherein the bicyclic amide acetal is one in which R, R' and R''' are hydrogen and R'' is methyl, the polymer which is not reactive with the bicyclic amide acetal is polyethyl oxazoline and the reactive monomer is 4,4'-methylene bis(phenyl isocyanate).

* * * * *